United States Patent [19]

Hwang et al.

[11] Patent Number: 4,999,036
[45] Date of Patent: Mar. 12, 1991

[54] FILTERING DEVICE FOR REMOVING LIQUID PARTICLES FROM AIR STREAMS OF AIR COMPRESSORS

[76] Inventors: Ming Y. Hwang; So Y. Lin, both of No. 67, Ta Hsin St., Tainan, Taiwan

[21] Appl. No.: 514,946

[22] Filed: Apr. 26, 1990

[51] Int. Cl.⁵ .............................................. B01D 50/00
[52] U.S. Cl. ........................................ 55/317; 55/321; 55/323; 55/337; 55/472; 55/437
[58] Field of Search ................. 55/317, 320, 321, 323, 55/337, 472, 473

[56] References Cited

U.S. PATENT DOCUMENTS

| | | | |
|---|---|---|---|
| 3,732,669 | 5/1973 | Chambers | 55/321 |
| 4,869,737 | 9/1989 | Parenti | 55/321 X |

Primary Examiner—Charles Hart
Attorney, Agent, or Firm—Steinberg & Raskin

[57] ABSTRACT

A filtering device for removing liquid particles from air streams of air compressors comprising a housing with an open side of which the interior is partitioned into three successive compartments, a lid which seals the housing, two filter layers which are constituted by a perforated plate and a filter sheet made of suitable filtration material, and a vane-type impeller which is rotated by the pressurized air from an air compressor to help moving the air through the filter layers. Between any two successive compartments, an air passage is formed with one of the filter layers fixed therein to remove liquid particles, such as water and oil particles. The removed liquid will be stored in reservoirs and then drained off.

7 Claims, 4 Drawing Sheets

FILTERING DEVICE FOR REMOVING LIQUID PARTICLES FROM AIR STREAMS OF AIR COMPRESSORS

BACKGROUND OF THE PRESENT INVENTION

The operation principle of air compressor is drawing in air from the environments, compressing the air drawn in by cylinders and pistons or the like, and pumping the compressed air out through conduits. Due to the humidity of air, the compressed air may be full of air particles. Since air compressors usually use oil as lubricant, the compressed air inevitably has some oil particles included therein. The liquid particles will affect nothing, if an air compressor is used to pump air only. On the other hand, if the pressurized air is used to operate an elaborate pneumatic equipment, such as a pneumatic manipulator, the liquid particles will damage the equipment.

One way to obviate the above problem is to use dryers to reduce the humidity of air in the place where an air compressor is installed. This, however, is not a successful method. It is more common to add a single-layer-filter to the downstream conduit to remove water particles from air streams. This method is much cheaper than using dryers to dry atmosphere air. However, it is not possible to remove oil particles very well with only one filter layer.

It is therefore the object of the present invention to provide a filtering device for better removing liquid particles from air streams of air compressors which comprise a housing with an open side of which the interior is partitioned into three successive compartments, a lid which seals the housing, two filter layers which are constituted by a perforated plate and a filter sheet made of suitable filtration material, and a vane-type impeller which is rotated by the pressurized air from an air compressor to help moving the air through the layers so that the water particles and oil particles can be more effectively removed to provide a cleaner pressurized air to pneumatic equipments.

Other features and advantages of the present invention will be apparent from the following description taken in conjunction with accompanying drawings, in which

DETAILED DESCRIPTION OF THE PREFERRED EMBODIMENT

Figure 1:
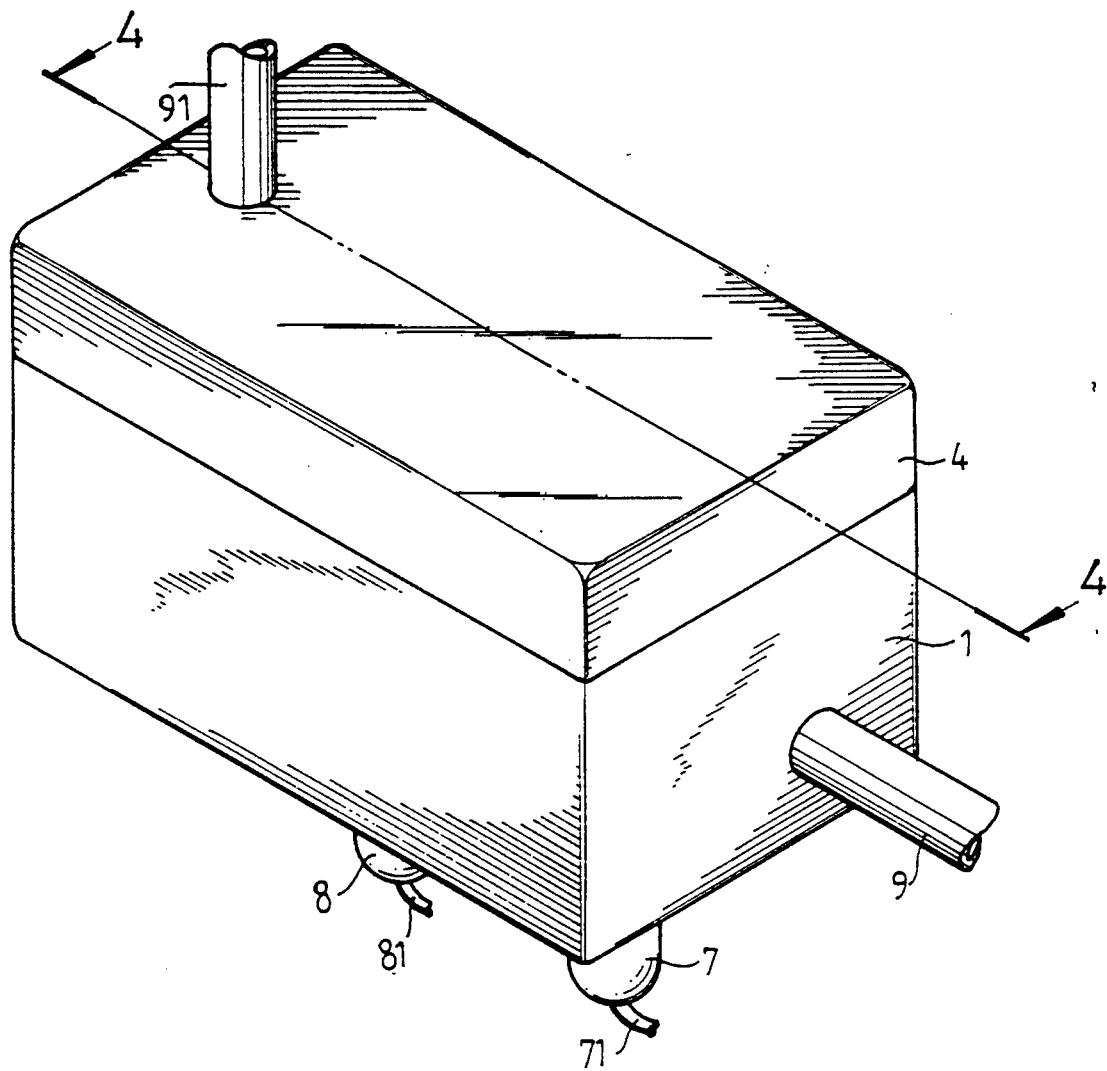
FIG. 1 is a perspective view of the filtering device for removing liquid particles from air streams of air compressors in accordance with the present invention.
Figure 2:
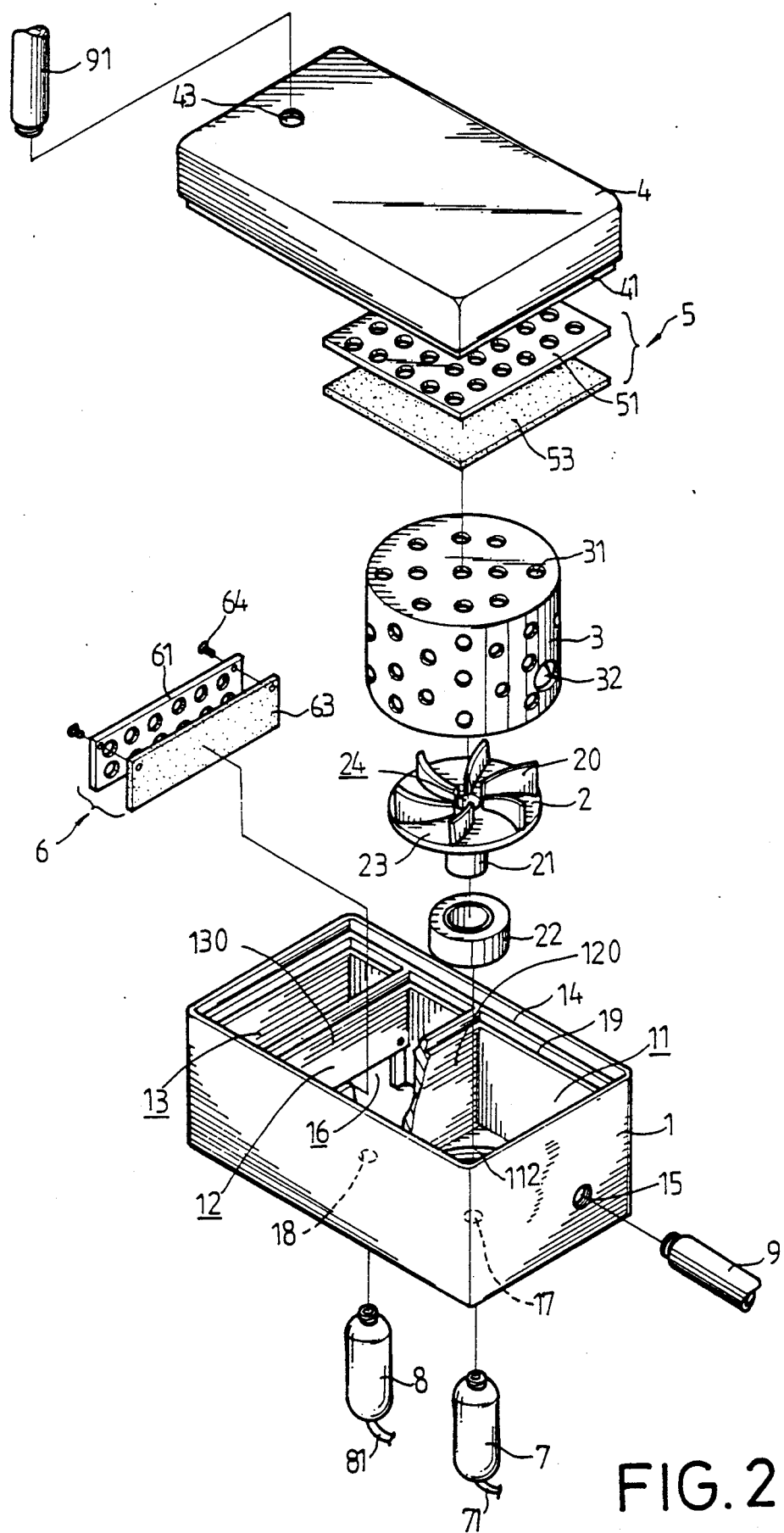
FIG. 2 is an exploded view of the filtering device for removing liquid particles from air streams of air compressors in accordance with the present invention.
Figure 3:
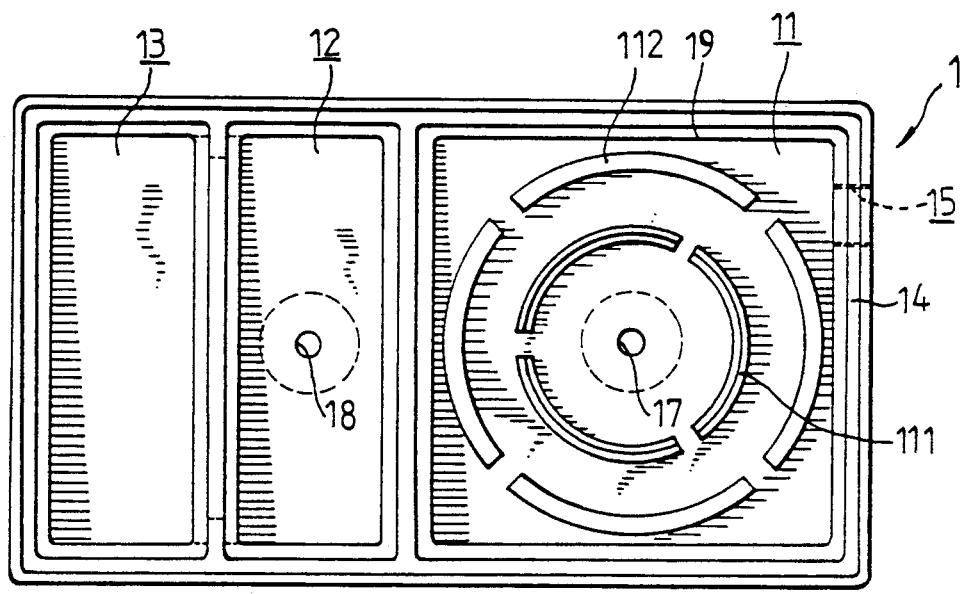
FIG. 3 is the top view of the housing of the filtering device for removing liquid particles from air streams of air compressors in accordance with the present invention.
Figure 4:
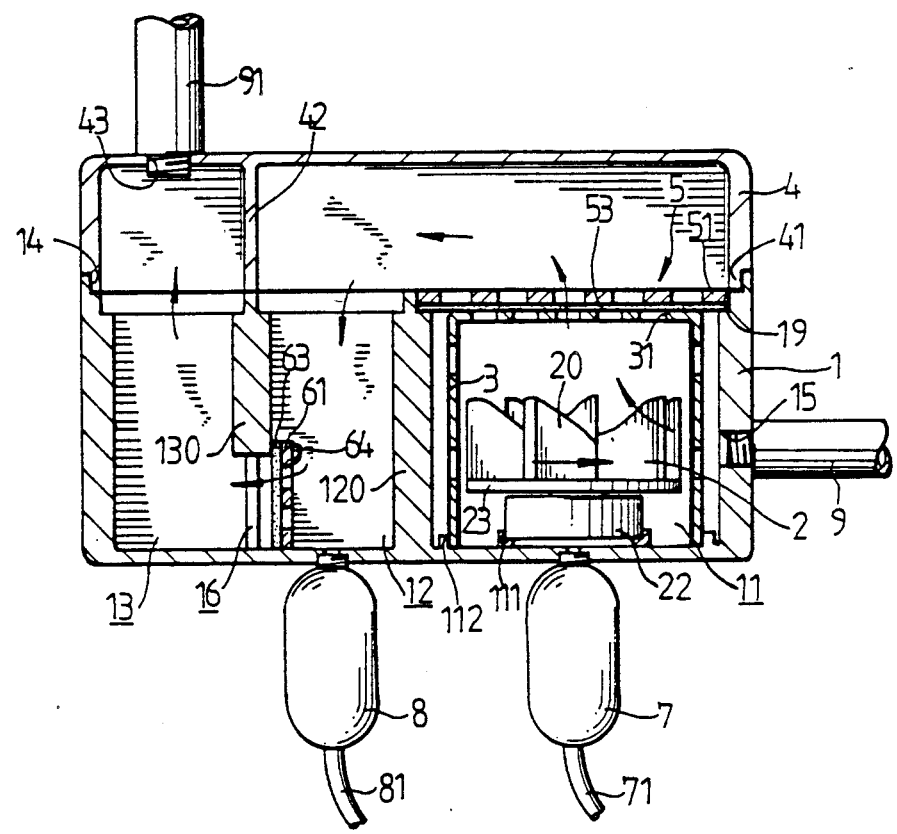
FIG. 4 is a cross-sectional view taken along line 4—4 of FIG. 1.

Referring to the drawings, the filtering device for removing liquid particles from air streams of air compressors comprises a housing 1 with an open side and a lid 4 with an interior space to seal the housing 1. The interior of the housing 1 is partitioned by two partitions 120 and 130 into three compartments 11, 12 and 13. The housing 1 further has a shoulder 14 formed along the open side thereof to receive a complementary shoulder 41 formed on the lid 4 so that when the lid 4 is disposed on the housing 1, an air-tight seal will be formed therebetween.

Disposed inside the first compartment 11 is a vane-type impeller 2 which comprises a plurality vanes 20 fixed on a first side of a disc 23 and a shaft 21 fixed on a second side of the disc 23. A hole 24 runs through the disc 23 and the center of the shaft 21 to allow liquid to follow therethrough. The shaft 21 is inserted into a bearinged seat 22 which is held in a first holder 111 formed on the bottom of the first compartment 11 so that the vane-type impeller 2 is rotatable with respect to the housing 1. Inside the first holder 111, a first draining hole 17 is formed to receive a first reservoir 7 with a drain line 71 therein so as to drain liquid off. A perforated cover 3 having a plurality of perforations 31 together with an air stream hole 32 is used to cover the vane-type impeller 3. The perforated cover 3 is held by a second holder 112 formed on the bottom of the first compartment 11. The first compartment 11 further has an air inlet 15 which is connected to an air supply conduit a from an air compressor (not shown). The pressurized air from the air supply conduit 9 is to directed through the air inlet 15 and the air stream hole 32 of the perforated cover 3 that the pressurized air stream will hit the vanes 20 eccentrically and thus rotating the vane-type impeller 2 with respect to the bearinged seat 22. The rotation of the vane-type impeller 2 will create circulation of air thereabout and liquid particles in the air stream will be removed due to centrifugal force and left on the inside surface of the perforated cover 3 when they hit the perforated cover 3. The removed liquid then follows to the reservoir 7 through the first draining hole 17.

The rotation of the vane-type impeller 2 also help the air stream to move through a first filter layer 5 which is tightly disposed on a seat 19 in the form of a shoulder along the upper edge of the first compartment 11. The seat 19 is located between the sealing shoulder 14 and the perforated cover 3 so that the disposition of the first filter layer 5 does not interfere the seal of the lid 4 on the housing 1 and the disposition of the cover 3. the first filter layer 5 is constituted by a perforated plate 51 and a filter sheet 53 made of suitable filtration material.

The air penetrating the first filter layer 5 follows over the first partition 120 to the second compartment 12 via a passage constituted by the interior of the lid 4 which has an internal partition 42 corresponding to the second partition 130 disposed between the second compartment 12 and the third compartment 13 of the housing 1 so as to prevent air streams from flowing from the first compartment 11 directly into the third compartment 13. An opening 16 which constitutes an air passage between the second and the third compartments 12, 13 is formed on the lower edge of the second compartment 130 to allow the air to follow from the second compartment 12 to the third compartment 13. A second filter layer 6 which is also constituted by a perforated plate 61 and a filter sheet 63 made of suitable filtration material is fixed on the second partition 130 by a fastening means, such as screws 64, to cover the opening 16 to that when air follows through the partition 130, liquid particles can be further removed. A second draining hole 18 is formed on the bottom of the second compartment 12 to receive a second reservoir 8 with a drain line 81 therein to drain liquid off.

The air leaves the third compartment 13 will then enter an air exhaust conduit 91 via an outlet 43 formed on the lid 4 and the directed to any place by the exhaust conduit 91.

Since the filtering device in accordance with the present invention is used to remove liquid including water, every parts thereof is preferably made of anti-corrosion material, such as stainless steel or high strength plastic material.

A filtering device for better removing liquid particles from air streams of air compressors is described above, various details of the invention may be modified and changed without departing the scope of the present. Further, the foregoing description is provided for the purpose of illustration only and not for the purpose of limitation—the invention being defined by the appended claims.

What is claimed is:

1. A filtering device for removing liquid particles from air streams of air compressors comprising a housing with an open side of which the interior is divided by a first partition and a second partition into three successive compartments, a first one, a second one, and a third one with the first partition sandwiched between the first and the second compartments and the second partition sandwiched between the second and the third compartments, a lid with an interior space which covers the open side of said housing and seals thereon by suitable sealing means, a vane-type impeller which is rotatably disposed in the first compartment, a perforated cover with an air stream hole completely covering said vane-type impeller, a first filter layer disposed in an air passage between the first and the second compartments to remove liquid from air streams when they follow from the first compartment to the second compartment, a second filter layer disposed in an air passage between the second and the third compartments to further remove liquid from the air streams when they go on following into the third compartment, a plurality of liquid reservoirs which are in fluid connection with said housing to receive the liquid removed from the air streams therein and drain the liquid off with a drain line connected thereto, an air inlet which is formed on said housing so as to provide a fluid connection between the first compartment and an air supply conduit which is connected to an air compressor, and an air outlet which is in fluid connection to the third compartment and an air exhaust conduit so that air is exhaustible from the third compartment, said air stream hole being so formed on said perforated cover that when pressurized air coming from said air supply conduit passes through said air stream hole, the pressureized air stream will hit said vane-type impeller eccentrically and rotated said vane-type impeller so as to create circulation of air inside said perforated cover which will remove liquid particles from air due to centrifugal force and leave liquid particles on the inside surface of said perforated cover.

2. A filtering device for removing liquid particles from air streams of air compressors as claimed in claim 1 wherein said vane-type impeller comprises a plurality of vanes fixed on a first side of a disc and shaft attached to a second side of said disc, said shaft being disposed in a bearinged seat which is, in turn, held by a first holder formed on the bottom of said first compartment so that said vanes are rotatable with respect to said first compartment and will be rotated about the central axis of said shaft when said vanes are eccentrically hit by said air streams passing through said air stream hole, and wherein said perforated cover is held by a second holder formed on the bottom of said first compartment so as to completely cover said vane-type impeller.

3. A filtering device for removing liquid particles from air streams of air compressors as claimed in claim 1, wherein said first filter layer is tightly disposed on a shoulder formed along the top edge of said first compartment and said air passage between said first and second compartments is constituted by the interior of said lid which has a partition corresponding to and contacting said second partition of said housing so as to prevent air from flowing from said first compartment directly into said third compartment.

4. A filter device for removing liquid particles from air streams of air compressors as claimed in claim 1, wherein said air passage between said second and third compartments is constituted by an opening formed on the lower edge of said second compartment of said housing and wherein said second filter layer is fixed on said second partition by a fastening means so as to cover said opening.

5. A filtering device for removing liquid particles from air streams of air compressors as claimed in claim 1, wherein said first and second filter layers are constituted by a perforated plate and a filter sheet.

6. A filtering device for removing liquid particles from air streams of air compressors as claimed in claim 1, wherein the number of said reservoirs is two and one of said reservoir is in fluid connection with said first compartment of said housing and the other is in fluid connection with said second compartment of said housing.

7. A filtering device for removing liquid particles from air streams of air compressors as claimed in claim 4 wherein said fastening means is screws.

* * * * *